(12) United States Patent
Ding (10) Patent No.: US 10,637,916 B2
(45) Date of Patent: Apr. 28, 2020

(54) METHOD AND DEVICE FOR STORAGE RESOURCE ALLOCATION FOR VIDEO CLOUD STORAGE

(71) Applicant: Hangzhou Hikvision Digital Technology Co., Ltd., Hangzhou, Zhejiang (CN)

(72) Inventor: Guangkai Ding, Zhejiang (CN)

(73) Assignee: Hangzhou Hikvision Digital Techonology. Co., Ltd. (CN)

( * ) Notice: Subject to any disclaimer, the term of this patent is extended or adjusted under 35 U.S.C. 154(b) by 0 days.

(21) Appl. No.: 15/999,872

(22) PCT Filed: Nov. 8, 2016

(86) PCT No.: PCT/CN2016/105084
§ 371 (c)(1),
(2) Date: Aug. 20, 2018

(87) PCT Pub. No.: WO2017/140130
PCT Pub. Date: Aug. 24, 2017

(65) Prior Publication Data
US 2019/0166192 A1   May 30, 2019

(30) Foreign Application Priority Data
Feb. 19, 2016   (CN) .......................... 2016 1 0094310

(51) Int. Cl.
*H04L 29/08* (2006.01)
*H04N 21/231* (2011.01)
*G06F 3/06* (2006.01)

(52) U.S. Cl.
CPC .......... *H04L 67/1008* (2013.01); *G06F 3/067* (2013.01); *G06F 3/0613* (2013.01);
(Continued)

(58) Field of Classification Search
CPC ............. H04L 67/1097; H04L 67/1031; H04L 67/1034; H04L 29/08153; H04L 67/1004;
(Continued)

(56) References Cited

U.S. PATENT DOCUMENTS 7,934,056 B2 *   4/2011   Sawdon .................. G06F 3/061
                                                      711/114
8,433,803 B2 *   4/2013   Madduri ............... G06F 9/5005
                                                      709/226
(Continued)

FOREIGN PATENT DOCUMENTS

CN         102123167         7/2011
CN         103036994 A       4/2013
(Continued)

OTHER PUBLICATIONS

International Search Report for International Application No. PCT/CN2016/105084 dated Jan. 20, 2017, 2 pages.

*Primary Examiner* — Sargon N Nano
(74) *Attorney, Agent, or Firm* — McDonnell Boehnen Hulbert & Berghoff LLP (57) ABSTRACT

Embodiments of the present disclosure provide a method and apparatus for allocating storage resource of video cloud storage, applicable to a management node in a storage cluster. The method comprising: receiving a video data storage request from a client; obtaining a queue of allocable storage nodes according to an encoder identifier contained in the request; determining if the request is sent for the first time according to the encoder identifier, if so, selecting from the queue of allocable storage nodes a target storage node allocable as a write node according to a stress estimation algorithm; or otherwise, selecting from the queue a target storage node allocable as a write node according to the number of current writes of each of the storage nodes in pre-recorded node synchronization information and the stress estimation algorithm; and feeding back address information of the target storage node to the client. Embodiments of the present disclosure allow storage loads of a cloud storage system to be balanced.

20 Claims, 3 Drawing Sheets

(52) U.S. Cl.
CPC ............ *G06F 3/0635* (2013.01); *H04L 29/08* (2013.01); *H04L 67/1097* (2013.01); *H04N 21/231* (2013.01); *H04N 21/23103* (2013.01)

(58) Field of Classification Search
CPC .............. H04L 67/1008; H04L 67/101; H04N 21/23103; H04N 21/23109; H04N 21/231; G06F 3/067
See application file for complete search history.

(56) References Cited

U.S. PATENT DOCUMENTS

| | | | | |
|---|---|---|---|---|
| 8,640,137 | B1 * | 1/2014 | Bostic | G06F 9/5072 718/104 |
| 8,719,223 | B2 * | 5/2014 | Knapp | G06F 11/1446 707/626 |
| 8,782,632 | B1 * | 7/2014 | Chigurapati | G06F 8/65 717/172 |
| 8,965,936 | B2 * | 2/2015 | Ismail | G06F 9/5016 707/812 |
| 9,009,294 | B2 * | 4/2015 | Dawson | G06F 9/5072 709/224 |
| 9,251,115 | B2 * | 2/2016 | Bursell | G06F 15/177 |
| 9,600,199 | B2 * | 3/2017 | Alva | G06F 16/258 |
| 10,051,046 | B1 * | 8/2018 | Zacharski | H04L 67/101 |
| 2014/0250232 | A1 | 9/2014 | Liu et al. | |
| 2015/0135229 | A1 * | 5/2015 | Liu | H04L 67/2842 725/53 |
| 2016/0357443 | A1 * | 12/2016 | Li | G06F 3/065 |

FOREIGN PATENT DOCUMENTS

| | | |
|---|---|---|
| CN | 103617083 | 3/2014 |
| CN | 105335387 A | 2/2016 |
| CN | 105338027 | 2/2016 |

\* cited by examiner

METHOD AND DEVICE FOR STORAGE RESOURCE ALLOCATION FOR VIDEO CLOUD STORAGE

RELATED APPLICATION

The present disclosure claims priority to the Chinese patent application No. 201610094310.3, filed with the State Intellectual Property Office of the People's Republic of China on Feb. 19, 2016 and entitled "Method and Apparatus for Storage Resource Allocation for Video Cloud Storage", which is incorporated herein by reference in its entirety.

TECHNICAL FIELD

The present disclosure relates to the field of computer cloud storage, and in particular to a method and apparatus for allocating storage resource of video cloud storage.

BACKGROUND

In most video cloud storage systems, to allocate data writing among storage nodes, a management server may typically evaluate comprehensively the storage nodes in terms of load conditions such as the current number of reads/writes, and accessing rates of CPUs, memories and disk IOs of the storage nodes, and then allocate the data to the storage node with a minimum stress at the moment. Such an allocation strategy may work well for a resource allocation request with a small concurrent storage requirement. However, in a case where the management server is arranged in a cluster and there is a request for a large quantity of storage, the strategy may not be satisfactory. It may occur that, some certain storage node may be allocated with too much of the data writing in a short time and the storage stress of the node is thus instantly increase. As a result, packet loss is inevitable.

Further, storage nodes in the video cloud storage system may have varying storage capacities. The load balancing policy known in the art simply takes into account of load conditions of individual storage nodes but fails to manage the video cloud storage system in a global view. As such, some of the storage nodes may not have any remaining space after a period of operation of the system, while others may have much left. In a system where the management operates according to the existing resource allocation policy, storage nodes having remaining spaces may suffer from increased stress for data writing.

SUMMARY

Embodiments of the present disclosure provide a method and apparatus for allocating storage resource of video cloud storage, in order to balance the load stress of a storage cluster. Specifically, the following solutions are disclosed.

In one aspect, embodiments of the present disclosure provide a method of allocating storage resource of video cloud storage, applicable to a management node in a storage cluster, the storage cluster comprising at least one management node and at least one storage node, the method comprising:

receiving a video data storage request sent by a client based on an encoder, the video data storage request containing an identifier of a resource pool into which video data is to be written and an identifier of the encoder;

obtaining, from a plurality of storage nodes corresponding to the identifier of the resource pool, a queue of allocable storage nodes for the video data storage request, wherein, the correspondence between an identifier of a resource pool and a storage node is predefined;

determining whether the identifier of the encoder is recorded in an encoder allocation tracing list; if so, selecting from the queue of allocable storage nodes a target storage node allocable as a write node, according to the number of current writes of each of the storage nodes in pre-recorded node synchronization information and a stress estimation algorithm; or otherwise, selecting, from the queue of allocable storage nodes, a target storage node allocable as the write node, according to the stress estimation algorithm; wherein the encoder allocation tracing list records the correspondence between an identifier of an encoder that has been allocated a storage node and the allocated storage node, and wherein the stress estimation algorithm is an algorithm for estimating the stress on a storage node according to the node synchronization information; and if a target storage node allocable as a write node is selected from the queue of allocable storage nodes, feeding back address information of the target storage node to the client based on the encoder to allow the client to write the video data corresponding to the video data storage request into the target storage node.

Optionally, the pre-recorded node synchronization information comprises: CPU utilization, bandwidth occupied by reading of video data, a number of current reads, bandwidth occupied by writing of video data, disk I/O utilization and memory utilization of a storage node;

the stress estimation algorithm comprises:

estimating writing stress of a storage node according to bandwidth occupied by writing of video data and the number of current writes of the storage node;

calculating the reading stress of a storage node, according to the bandwidth occupied by reading of video data and the number of current reads of the storage node; and estimating stress of the storage node according to the CPU utilization, the memory utilization, the disk IO utilization, the estimated writing stress and the reading stress of the storage node.

Optionally, the writing stress of the storage node is estimated as follows:

the estimated writing stress of the storage node=the sum of the numbers of current writes of all the storage nodes in the storage cluster*(the bandwidth occupied by writing of video data of the storage node/the number of current writes of the storage node);

the reading stress of the storage node is calculated as follows:

the reading stress of the storage node=the sum of the numbers of current reads of all the storage nodes in the storage cluster*(the bandwidth occupied by reading of video data of the storage node/the number of current reads of the storage node).

Optionally, the method for allocating storage resource of video cloud storage according to an embodiment of the present disclosure further comprises:

i if a target storage node allocable as a write node cannot be selected from the queue of allocable storage nodes, selecting randomly a storage node to be the target storage node from the queue of allocable storage nodes, and providing the address information of the target storage node to the client based on the encoder to allow the client to write the video data corresponding to the video data storage request into the target storage node.

Optionally, the video data storage request further comprises the network address of the client;

obtaining, from a plurality of storage nodes corresponding to the identifier of resource pool, a queue of allocable storage nodes for the video data storage request comprises:

determining, from the plurality of storage nodes corresponding to the identifier of resource pool, storage nodes corresponding to a network address of the client; wherein the correspondence between ranges of network addresses and storage nodes is predefined; and obtaining, from the determined storage nodes corresponding to the network address of the client, a queue of allocable storage nodes for the video data storage request.

Optionally, the method for allocating storage resource of video cloud storage according to an embodiment of the present disclosure further comprises:

increasing the number of current writes of the target storage node by one, to update the node synchronization information of the target storage node.

Optionally, selecting from the queue of allocable storage nodes a target storage node allocable as a write node, according to the number of current writes of each of the storage nodes in pre-recorded node synchronization information and a stress estimation algorithm write node comprises:

determining, from the queue of allocable storage nodes, a storage node allocated for the encoder last time, according to the encoder allocation tracing list;

taking a storage node next to the storage node allocated last time in the queue of allocable storage nodes as a to-be-determined current storage node and performing the selection operations as follows:

obtaining the number of current writes of the current storage node, from the pre-recorded node synchronization information for storage nodes;

calculating a recommended number of writes of the current storage node;

determining whether the number of current writes is smaller than the recommended number of writes, and if the number of current writes is smaller than the recommended number of writes, estimating the stress of the storage node according to the stress estimation algorithm; if the estimated stress is smaller than a predetermined threshold, selecting the current storage node as the target storage node allocable as a write node, and terminating the selection process, or if the estimated stress is not smaller than the predetermined threshold, proceeding back to the step of taking a storage node next to the current storage node in the queue of allocable storage nodes as a to-be-determined current storage node and performing the selection operations until all storage nodes in the queue of allocable storage nodes have been taken as a to-be-determined current storage node;

if the number of current writes is larger than or equal to the recommended number of writes, proceeding back to the step of taking a storage node next to the current storage node in the queue of allocable storage nodes as a to-be-determined current storage node and performing the selection operations until all storage nodes in the queue of allocable storage nodes have been taken as a to-be-determined current storage node.

Optionally, the recommended number of writes of the current storage node is calculated as follows:

the recommended number of writes of the current storage node=the total of writes of all the storage nodes in the storage cluster*(the total storage space of the current storage node/the total storage space of all the storage nodes).

Optionally, selecting, according to a stress estimation algorithm, a target storage node allocable as a write node from the queue of allocable storage nodes comprises:

estimating the stress of each storage node in the queue of allocable storage nodes according to the stress estimation algorithm based on the node synchronization information; and selecting randomly from the storage nodes a storage node having an estimated stress lower than a predetermined threshold, as the target storage node allocable as the write node.

Optionally, the method for allocating storage resource of video cloud storage according to an embodiment of the present disclosure further comprises:

decreasing the number of current writes of the determined storage node allocated to the encoder last time by one, in the recorded node synchronization information of the storage nodes.

Optionally, obtaining, from a plurality of storage nodes corresponding to the identifier of resource pool, a queue of allocable storage nodes for the video data storage request comprises:

determining at least one storage node satisfying an allocation condition from the plurality of storage nodes corresponding to the identifier of the resource pool, according to pre-recorded node synchronization information of the storage nodes; and establishing the queue of allocable storage nodes for the video data storage request based on the at least one storage node satisfying the allocation condition.

Optionally, the node synchronization information further comprises: online status, operation state, and remaining space of a storage node;

a storage node satisfies the allocation condition if the synchronization information indicates that the storage node is online, in a normal operation state, and having remaining storage space;

or, the node synchronization information comprises: online status, operation state, remaining space, formatting state, the number of current writes, and a maximum number of current writes of a storage node;

a storage node satisfies the allocation condition if the synchronization information indicates that the storage node is online, in a normal operation state, having remaining storage space, and not being formatted, and the number of current writes is smaller than the maximum number of writes.

Optionally, the video data storage request is sent by the client based on at least one encoder at a preset time interval.

In another aspect, embodiments of the present disclosure provide an apparatus for allocating storage resource of video cloud storage, applicable to a management node in a storage cluster, the storage cluster comprising at least one management node and at least one storage node, the apparatus comprising:

a video data storage request receiving module configured for receiving a video data storage request sent by a client based on an encoder, the video data storage request containing the indentifier of a resource pool into which a video data is to be written and an identifier of the encoder;

an allocable storage node queue obtaining module configured for obtaining, from a plurality of storage nodes corresponding to the identifier of the resource pool, a queue of allocable storage nodes for the video data storage request, wherein, the correspondence between an identifier of a resource pool and a storage node is predefined;

a determining module configured for determining whether the identifier of the encoder is recorded in an encoder allocation tracing list; if so, activating a first target storage node determining module, or otherwise, activating a second target storage node determining module, wherein the encoder allocation tracing list records the correspondence between an identifier of an encoder that has been allocated a storage node and the allocated storage node;

the first target storage node determining module is configured for selecting from the queue of allocable storage nodes a target storage node allocable as a write node, according to the number of current writes of each of the storage nodes in pre-recorded node synchronization information and a stress estimation algorithm, wherein the stress estimation algorithm is an algorithm for estimating the stress on a storage node according to the node synchronization information;

the second target storage node determining module is configured for selecting, from the queue of allocable storage node, a target storage node allocable as the write node, according to the stress estimation algorithm; and a first target storage node address information returning module configured for, if a target storage node allocable as a write node is selected from the queue of allocable storage nodes, feeding back the address information of the target storage node to the client based on the encoder to allow the client to write the video data corresponding to the video data storage request into the target storage node.

Optionally, the pre-recorded node synchronization information comprises: CPU utilization, bandwidth occupied by reading of video data, a number of current reads, bandwidth occupied by writing of video data, disk I/O utilization and memory utilization of a storage node;

the stress estimation algorithm utilized by the first target storage node determining module and the second target storage node determining module comprises:

estimating writing stress of a storage node according to bandwidth occupied by writing of video data and the number of current writes of the storage node;

calculating the reading stress of a storage node, according to the bandwidth occupied by reading video data and the number of current reads of the storage node; and estimating stress of the storage node according to the CPU utilization, the memory utilization, the disk IO utilization, the estimated writing stress and the reading stress of the storage node.

Optionally, the writing stress of the storage node is estimated as follows:

the estimated writing stress of the storage node=the sum of the numbers of current writs of all the storage nodes in the storage cluster*(the bandwidth occupied by writing of video data of the storage node/the number of current writs of the storage node);

the reading stress of the storage node is calculated as follows:

the reading stress of the storage node=the sum of the numbers of current reads of all the storage nodes in the storage cluster*(the bandwidth occupied by reading of video data of the storage node/the number of current reads of the storage node).

Optionally, the apparatus for allocating storage resource of video cloud storage according to an embodiment of the present disclosure further comprises: a second target storage node address information returning module configured for, if a target storage node allocable as a write node cannot be selected from the queue of allocable storage nodes, selecting randomly a storage node to be the target storage node from the queue of allocable storage nodes, and providing the address information of the target storage node to the client based on the encoder to allow the client to write the video data corresponding to the video data storage request into the target storage node.

Optionally, the video data storage request further comprises the network address of the client;

the allocable storage node queue obtaining module comprises a first storage node determining submodule and a first allocable storage node queue obtaining submodule;

the first storage node determining submodule is configured for determining, from the plurality of storage nodes corresponding to the identifier of resource pool, storage nodes corresponding to the network address of the client; wherein the correspondence between ranges of network addresses and storage nodes is predefined;

the first allocable storage node queue obtaining submodule is configured for obtaining, from the determined storage nodes corresponding to a network address of the client, a queue of allocable storage nodes for the video data storage request.

Optionally, the apparatus for allocating storage resource of video cloud storage according to an embodiment of the present disclosure further comprises: an increasing module configured for increasing the number of current writes of the target storage node by one, to update the node synchronization information of the target storage node.

Optionally, the first target storage node determining module comprises:

a second storage node determining submodule configured for determining, from the queue of allocable storage nodes, a storage node allocated for the encoder last time, according to the encoder allocation tracing list;

a storage node processing submodule configured for taking a storage node next to the allocated storage node allocated last time in the queue of allocable storage nodes as a to-be-determined current storage node and performing the selection operations as follows:

obtaining the number of current writes of the current storage node, from the pre-recorded node synchronization information for storage nodes;

calculating a recommended number of writes of the current storage node;

determining whether the number of current writes is smaller than the recommended number of writes, and if the number of current writes is smaller than the recommended number of writes, estimating the stress of the storage node according to the stress estimation algorithm; if the estimated stress is smaller than a predetermined threshold, selecting the current storage node as the target storage node allocable as a write node, and terminating the selection process, or if the estimated stress is not smaller than the predetermined threshold, proceeding back to the step of taking a storage node next to the current storage node in the queue of allocable storage nodes as a to-be-determined current storage node and performing the selection operations until all storage nodes in the queue of allocable storage nodes have been taken as a to-be-determined current storage node;

if the number of current writes is larger than or equal to the recommended number of writes, proceeding back to the step of taking a storage node next to the current storage node in the queue of allocable storage nodes as a to-be-determined current storage node and performing the selection operations until all storage nodes in the queue of allocable storage nodes have been taken as a to-be-determined current storage node.21. The apparatus according to claim 20, wherein the storage node processing submodule calculates the recommended number of writes of the current storage node as follows:

the recommended number of writes of the current storage node=the total of writes of all the storage nodes in the storage cluster*(the total storage space of the current storage node/the total storage space of all the storage nodes).

Optionally, the storage node processing submodule calculates the recommended number of writes of the current storage node as follows:

the recommended number of writes of the current storage node=the total of writes of all the storage nodes in the storage cluster*(the total storage space of the current storage node/the total storage space of all the storage nodes).

Optionally, the second target storage node determining module comprises a stress estimation submodule and a target storage node determining submodule;

the stress estimation submodule is configured for estimating the stress of each storage node in the queue of allocable storage nodes according to the stress estimation algorithm based on the node synchronization information;

the target storage node determining submodule is configured for selecting randomly from the storage nodes a storage node having an estimated stress lower than a predetermined threshold, as the target storage node allocable as the write node.

Optionally, the apparatus for allocating storage resource of video cloud storage according to an embodiment of the present disclosure further comprises: a decreasing module configured for decreasing the number of current writes of the determined storage node allocated to the encoder last time by one, in the recorded node synchronization information of the storage nodes.

Optionally, the allocable storage node queue obtaining module comprises a third storage node determining submodule and a second allocable storage node queue determining submodule;

the third storage node determining submodule is configured for determining at least one storage node satisfying an allocation condition from the plurality of storage nodes corresponding to the identifier of the resource pool, according to pre-recorded node synchronization information of the storage nodes;

the second allocable storage node queue determining submodule is configured for establishing the queue of allocable storage nodes for the video data storage request based on the at least one storage node satisfying the allocation condition.

Optionally, the node synchronization information further comprises: online status, operation state, and remaining space of a storage node;

a storage node satisfies the allocation condition if the synchronization information indicates that the storage node is online, in a normal operation state, and having remaining storage space;

or, the node synchronization information comprises: online status, operation state, remaining space, formatting state, the number of current writes, and a maximum number of current writes of a storage node;

a storage node satisfies the allocation condition if the synchronization information indicates that the storage node is online, in a normal operation state, having remaining storage space, and not being formatted, and the number of current writes is smaller than the maximum number of writes.

Optionally, the video data storage request is sent by the client based on at least one encoder at a preset time interval.

In another aspect, embodiments of the present disclosure further provide an electronic device, comprising: a housing, a processor, a memory, a circuit board and a power supply circuit, wherein the circuit board is placed within the space enclosed by the housing; the processor and memory are disposed on the circuit board; the power supply circuit is configured for supplying power to circuits and devices of the electronic device; the memory is configured for storing executable program instructions; and the processor is configured for executing the program instructions stored in the memory to perform the method for allocating storage resource of video cloud storage as provided by embodiments of the present disclosure.

In another aspect, embodiments of the present disclosure further provide an executable program, configured for performing, when executed, the method for allocating storage resource of video cloud storage according to embodiments of the present disclosure.

In another aspect, embodiments of the present disclosure further provide a storage medium configured for storing executable program codes, which, when executed, perform the method for allocating storage resource of video cloud storage according to embodiments of the present disclosure.

In contrast with the prior art, in the present disclosure, a video data storage request is first received, a queue of allocable storage nodes for the video data storage request may be obtained. Determination is made, according to the identifier of the encoder as contained in the video data storage request, whether the identifier of the encoder is recorded in an encoder allocation tracing list. If so, a target storage node allocable as a write node is selected from the queue of allocable storage nodes according to the number of current writes of each of the storage nodes in pre-recorded node synchronization information and a stress estimation algorithm. Or otherwise, a target storage node allocable as the write node is selected from the queue of allocable storage nodes according to the stress estimation algorithm. If a target storage node allocable as a write node is selected from the queue of allocable storage nodes, the address information of the target storage node is fed back to the client based on the encoder to allow the client to write the video data corresponding to the video data storage request into the target storage node.

In the present disclosure, in addition to load stress, storage capacity of each storage node is also taken into account to select target storage nodes. As a result of the consideration in both aspects, storage loads of a cloud storage system can be balanced. Of course, it is not necessary for any product or method of the present disclosure to have all the advantages described above.

BRIEF DESCRIPTION OF THE DRAWINGS

To clearly illustrate the technical solutions of embodiments of the present application and the prior art, some accompanying drawings are provided as briefly described below. Obviously, these accompanying drawings are only for some embodiments of the present application, and those skilled in the art can obtain other drawings based on the accompanying drawings without any creative efforts.

DETAILED DESCRIPTION

Technical solutions in the embodiments of the present application are clearly and completely described below with reference to the accompanying drawings in association with embodiments of the present application. Obviously, the described embodiments are merely a part of but not all the embodiments of the present application. All other embodiments obtained without creative efforts in view of the embodiments of the present application by those skilled in the art fall within the scope of the present application.

In order to balance the loads among storage nodes in a storage cluster and improve statability of the performance of the storage cluster, embodiments of the present disclosure provide a method and apparatus for allocating storage resource of video cloud storage.

The method for allocating storage resource of video cloud storage according to embodiments of the present disclosure is first introduced in the following.

It is appreciated that the method for allocating storage resource of video cloud storage as provided in embodiments of the present disclosure is applicable to a management node in a storage cluster, which includes at least one management node and at least one storage node. Further, each management node in the storage cluster may respond concurrently to a video data storage request sent by a client.

In addition, in the method for allocating storage resource of video cloud storage according to embodiments of the present disclosure, each management node may maintain, in real time, node synchronization information of each storage node. Therefore the method for allocating storage resource of video cloud storage according to embodiments of the present disclosure can be applied to a management node, regardless of deployment manner.

Figure 1:
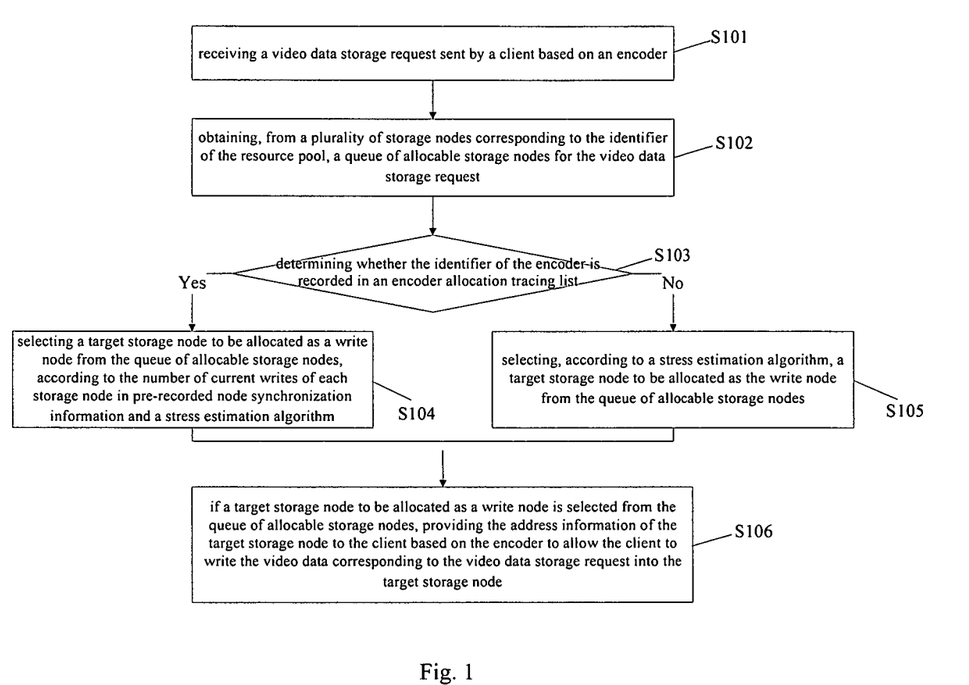
FIG. 1 is a flow chart of a method for allocating storage resource of video cloud storage according to an embodiment of the present disclosure.

FIG. 1 illustrates the method for allocating storage resource of video cloud storage. The method may comprise, as shown in FIG. 1, the following steps:

S101: receiving a video data storage request sent by a client based on an encoder.

The video data storage request may contain the identifier of the resource pool into which the the video data is to be written and the identifier of the encoder, to facilitate subsequent selection of a storage node for the video data storage request. A client may comprise at least one encoder. The client may be, for example, a terminal that is capable of obtaining and displaying video signals acquired by a video signal acquisition device, or a DVR (Digital Video Recorder) that is capable of obtaining, storing and displaying video signals acquired by the video signal acquisition device. The encoder is used to identify video signals acquired by different video acquisition devices. In one implementation, the encoder may be a video channel for a video signal acquisition device. Each video signal acquisition device has its own video channel.

In other words, the acquired video information may be regarded as a video signal.

In one implementation, the video data storage request may be sent, at preset time intervals, by the client based on the at least one encoder.

It is appreciated that, the client may send concurrently multiple video data storage requests to the cloud storage system, each video data storage request corresponding to one encoder. The client may periodically send the video data storage requests based on each encoder at certain time intervals. The time intervals may be preset to be equal or unequal. For example, the requests may be sent at a time interval of 2 min, or at alternating time intervals of 2 min and 4 min.

It is appreciated that the identifier of the resource pool may be the name, serial number, address or creation time of the resource pool. Any information that can be used to uniquely identify the resource pool may serve as the identifier of resource pool. The identifier of encoder may be the name, serial number or network address of the encoder. Any information that can be used to uniquely identify the encoder may serve as the identifier of encoder. For example, the user may desire to write video data into a virtual region (e.g., one of a plurality of virtual regions partitioned for or by a user) of a cloud disk through the client. A virtual region corresponds to a resource pool pre-allocated by the provider of the cloud disk. A virtual region may correspond to one resource pool, or a plurality of virtual regions may correspond to one resource pool. All of these are feasible.

S102: obtaining, from a plurality of storage nodes corresponding to the identifier of the resource pool, a queue of allocable storage nodes for the video data storage request;

Each resource pool may correspond to a predetermined storage node. In other words, for a given identifier of resource pool, the corresponding storage node can be determined. There may be one-to-one, one-to-many, many-to-one, or many-to-many correspondences between the resource pools and the storage nodes. Embodiments of the present disclosure are not limited in such correspondences between the resource pools and storage nodes.

It is noted that the allocable storage nodes in the queue may be arranged in a fixed order, which may be determined based on physical identities of the storage nodes.

Furthermore, in practice, video data of a client having an IP address within a certain range may be written into several storage nodes, such that the storage nodes become more associated with the client. As such, the video data storage request may further include the network address of the client.

Accordingly, obtaining, from a plurality of storage nodes corresponding to the identifier of resource pool, a queue of allocable storage nodes for the video data storage request may include:

determining, from the plurality of storage nodes corresponding to the identifier of resource pool, storage nodes corresponding to the network address of the client; wherein the correspondence between the ranges of network address and the the storage nodes is predefined; and obtaining, from the determined storage nodes corresponding to the network address of the client, a queue of allocable storage nodes for the video data storage request.

It may be appreciated that each client has a unique network address. Therefore, the range in which the network address falls can be determined. As a result, the storage node corresponding to the range can be determined in view of the predefined correspondence between ranges of network address and storage nodes.

In an example, the network address of the client is 190.118.0.0 and storage nodes 1, 2, 3, and 4 correspond to the identifier of resource pool and the network address. Therefore, the queue of allocable storage nodes for the video data storage request may be obtained from these four storage nodes.

In another implementation, to ensure that each of the storage nodes in the obtained queue of allocable storage nodes is available, the step of obtaining, from a plurality of storage nodes corresponding to the identifier of resource pool, a queue of allocable storage nodes for the video data storage request may include:

determining at least one storage node satisfying an allocation condition from the plurality of storage nodes corresponding to the identifier of resource pool, according to pre-recorded node synchronization information of the storage nodes; and establishing the queue of allocable storage nodes for the video data storage request based on the at least one storage node satisfying the allocation condition.

The node synchronization information may comprise online status, operation state, and remaining space of a storage node.

a storage node satisfies the allocation condition if the synchronization information indicates that the storage node is online, in a normal operation state, and having remaining storage space.

In addition to online status, operation state, and remaining space, the node synchronization information may further comprise formatting state, a number of current writes, and a maximum number of writing tasks of a storage node;

As such, a storage node satisfies the allocation condition if the synchronization information indicates that the storage node is online, in a normal operation state, having remaining storage space, and not being formatted, and the number of current writes is smaller than the maximum number of writes.

It is noted that, the online status, normal operation and remaining storage space are basic conditions for an allocable storage node. The above allocation conditions only serve as examples and should not be construed as limiting the embodiments of the present disclosure. It may be appreciated that, the step of obtaining, from the determined storage nodes corresponding to the network address of the client, a queue of allocable storage nodes for the video data storage request may be implemented in the same manner as the step of obtaining, from the storage nodes corresponding to the identifier of the resource pool, a queue of allocable storage nodes for the video data storage request based on the allocation condition.

S103: determining whether the identifier of the encoder is recorded in an encoder allocation tracing list, and if so, proceeding to step S104, or otherwise, proceeding to step S105.

If the client has a previous transmission of a video data storage request based on a encoder and the encoder has been allocated with a storage node, the identifier of the encoder is then recorded in an encoder allocation tracing list. The encoder allocation tracing table may also record a correspondence between the identities of the encoders and their allocated storage nodes.

It is noted that the encoder allocation tracing table may be stored in all management nodes in the storage cluster. Alternatively, the encoder allocation tracing table may be stored in any storage node in the storage cluster and provided to each management node by the storage node. Of course, the encoder allocation tracing table may also be stored by the client, and provided to each management node in the storage cluster when the client sends a video data storage request to the storage cluster. All of these are feasible.

S104: selecting a target storage node to be allocated as a write node from the queue of allocable storage nodes, according to the number of current writes of each storage node in pre-recorded node synchronization information and a stress estimation algorithm.

It is appreciated that, to select the target storage node to be allocated as a write node, each storage node in the queue may be examined in turn. The stress estimation algorithm is directed to estimate the stress of a storage node according to the node synchronization information.

The node synchronization information may include load condition of each storage node in the storage cluster. The storage node may synchronize its load conditions with each management node in the storage cluster through zookeeper service. Accordingly, each management node may update the load information stored thereon. As an open source implementation of Chubby of Google and an important component of Hadoop and Hbase, zookeeper is a distributed, and open-source coordination service for distributed applications. Zookeeper may be a software providing distributed applications with consistency services, such as configuration maintenance, name service, distributed synchronization, and group service.

To provide a comprehensive understanding of the solution, detailed description of an specific implementation of selecting a target storage node to be allocated as a write node from the queue of allocable storage nodes, according to the number of current writes for each storage node in pre-recorded node synchronization information and a stress estimation algorithm will be presented in the following. The stress estimation algorithm will also be described in detail.

S105: selecting, according to a stress estimation algorithm, a target storage node to be allocated as the write node from the queue of allocable storage nodes;

The stress estimation algorithm is directed to estimate the stress of a storage node according to the node synchronization information.

To provide a comprehensive understanding of the solution, detailed description of an specific implementation of selecting, according to the stress estimation algorithm, a target storage node that is to be allocated as a write node from the queue of allocable storage nodes will be presented in the following.

S106, if a target storage node to be allocated as a write node is selected from the queue of allocable storage nodes, providing the address information of the target storage node to the client based on the encoder to allow the client to write the video data corresponding to the video data storage request into the target storage node.

In one implementation, once the target storage node to be allocated as a write node is determined, to ensure the accuracy of the node synchronization information of a storage node, the method for allocating storage resource of video cloud storage according to embodiments of the present disclosure may further include:

incrementing the number of current writes of the target storage node to update the node synchronization information for the target storage node.

Furthermore, the method for allocating storage resource of video cloud storage according to embodiments of the present disclosure may further include:

if a target storage node to be allocated as a write node is not obtained from the queue of allocable storage nodes, selecting randomly a storage node from the queue of allocable storage nodes as the target storage node, and providing the address information of the selected target storage node to the client based on the encoder, so that the client writes the video data corresponding to the video data storage request into the target storage node.

It is appreciated that, in each storage node of the storage cluster, data is stored in blocks. Once all the blocks are full, the storage node may notify the client through a management node. If the video data of the client has not yet been completely stored, the client may retransmit, based on its encoder, the video data storage request to the management node.

In the embodiments of the present disclosure, for a encoder that requests video data storage for the first time, a different allocation method is employed to select the target storage node to serve as the write node. Further, in addition to load stress, the storage capacity of each storage node is also taken into account in order to select the target storage node. A recommended number of writes is calculated. Therefore, a larger number of writes may be distributed to storage nodes with higher capacities, and a smaller number of writes may be distributed to storage nodes with lower capacities. A stress estimation algorithm is employed to estimate the stress on each storage node. As such, each storage node may be prevented from excessive load stress. The storage cluster may have a balanced load and more stable operation.

Figure 2:
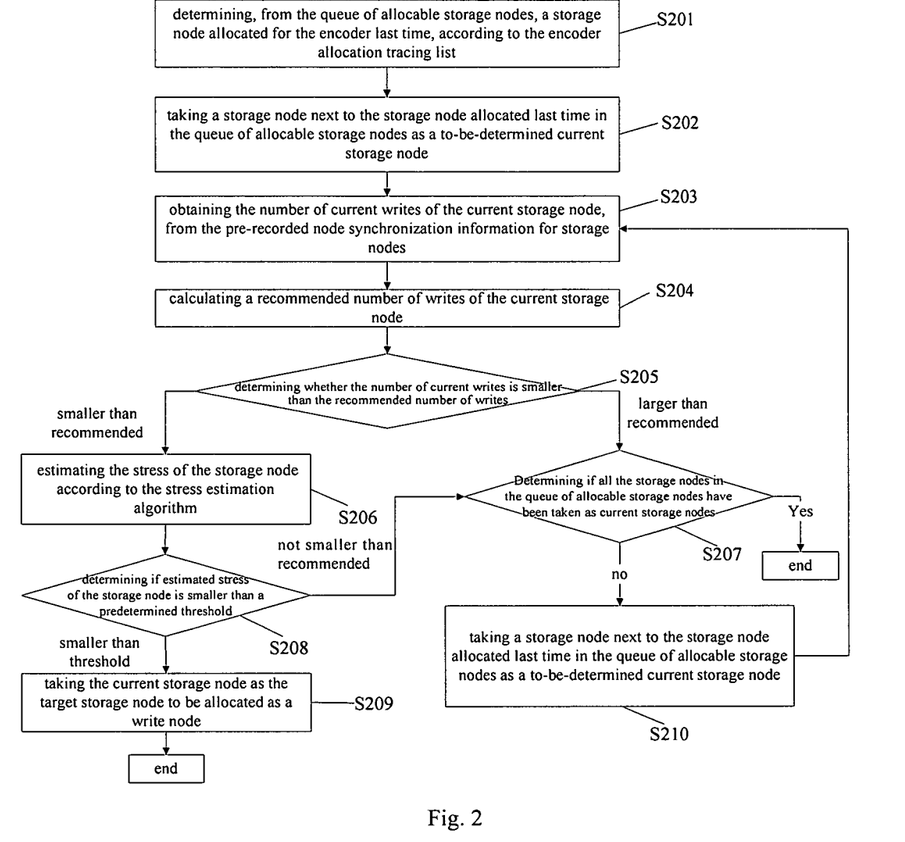
FIG. 2 is a flow chart of another method for allocating storage resource of video cloud storage according to an embodiment of the present disclosure.

In one implementation, to select the target storage nodes allocable as write nodes, the step of obtaining a target storage node to be allocated as a write node from the queue of allocable storage nodes according to the number of current writes of storage nodes in pre-recorded node synchronization information and a stress estimation algorithm may comprise the steps as shown in FIG. 2.

The encoder tracing list records the correspondence between identities of the encoders allocated with storage nodes and the allocated storage nodes. Therefore, it is possible to know, based on the encoder tracing table, the storage node allocated for the previous video data storage request of the encoder.

S201, determining, from the queue of allocable storage nodes, a storage node allocated for the encoder last time, according to the encoder allocation tracing list.

S202, taking a storage node next to the storage node allocated last time in the queue of allocable storage nodes as a to-be-determined current storage node.

The following operations are then performed.

S203, obtaining the number of current writes of the current storage node, from the pre-recorded node synchronization information for storage nodes.

S204, calculating a recommended number of writes of the current storage node.

To have knowledge of the load information of the storage nodes in the storage cluster in real time, the management node may calculate in real time the recommended number of writes of the storage nodes according to the node synchronization information fed back by the storage nodes in the storage cluster. The management node may also calculate the recommended number of writes of the storage nodes at a preset time interval according to known node synchronization information of the storage nodes. For example, the preset time interval may be 3 min.

It needs to be appreciated that it is possible to decrease the number of current writes of the determined storage node allocated to the encoder last time by one, in the recorded node synchronization information of the storage nodes.

In one implementation, the recommended number of writes of the current storage number may be calculated as follows:

the recommended number of writes of the current storage node=the sum of writes of all the storage nodes in the storage cluster*(the total storage space of the current storage node/the total storage space of all the storage nodes).

For example, the storage cluster includes five storage nodes A, B, C, D, and E. A has a storage space of 3000G, B has a storage space of 2000G, C has a storage space of 1000G, D has a storage space of 1000G, and E has a storage space of 3000G. The storage space of the storage cluster, i.e., the total storage space of all the storage nodes is thus 10000G (3000+2000+1000+1000+3000). Meanwhile, 1000 clients concurrently request to write video data into the storage cluster at the present moment. Therefore, the recommended number of writes of each storage node may be calculated according to the storage space thereof as follows: the recommended number of writes of storage node A is 1000*(3000/10000)=300; likewise, the recommended number of writes of storage node B is 200, the recommended number of writes of storage node D is 100, and the recommended number of writes of E is 300.

S205, determining whether the number of current writes is smaller than the recommended number of writes, if positive, proceeding to step S206, or otherwise proceeding to step S207.

For example, when the management node receives a video data storage request sent by the client based on its encoder, the request is allocated in a rotating manner to storage node C. If the number of current writes of C is 100, the methods proceeds to step S207; or otherwise, the method proceeds to step S206.

S206, estimating the stress of the storage node according to the stress estimation algorithm. The method then proceeds to step S208.

S207, determining if all the storage nodes in the queue of allocable storage nodes have been taken as current storage nodes, if so, the method terminates; or otherwise, the method proceeds to step S210.

S208, comparing the estimated stress of the storage node with a predetermined threshold, and preceeding to step S209 if the estimated stress is smaller than the predetermined threshold, or otherwise proceeding to step S207.

S209, taking the current storage node as the target storage node to be allocated as a write node. The method terminates.

S210, taking a storage node next to the storage node allocated last time in the queue of allocable storage nodes as a to-be-determined current storage node and preceeding to step S203.

By examining all the storage nodes in the queue of allocable storage nodes in turn, the miss of any storage node can be avoided.

The recommended number of current writes of a storage node is calculated. The varying storage capacities of storage nodes are considered during the selection of write nodes. A larger number of writes may be distributed to storage nodes with higher capacities, and a smaller number of writes may be distributed to storage nodes with lower capacities. In combination with the stress estimation algorithm of the storage nodes, load balancing of storage nodes can be achieved.

Figure 3:
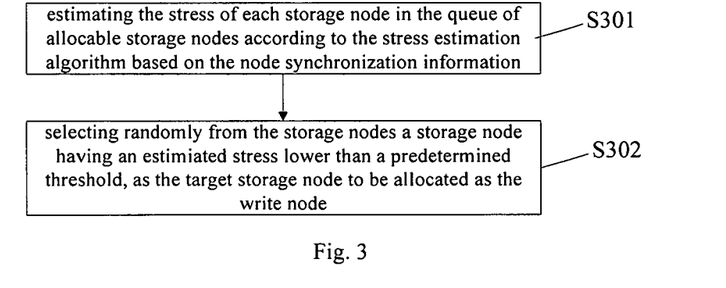
FIG. 3 is a flow chart of a third method for allocating storage resource of video cloud storage according to an embodiment of the present disclosure.

In one implementation, for a better selection of a target storage node allocable as a write node, the step of selecting, according to a stress estimation algorithm, a target storage node allocable as a write node from the queue of allocable storage nodes may comprise, as shown in FIG. 3, the following steps.

S301, estimating the stress of each storage node in the queue of allocable storage nodes according to the stress estimation algorithm based on the node synchronization information.

S302, selecting randomly from the storage nodes a storage node having an estimated stress lower than a predetermined threshold, as the target storage node to be allocated as the write node.

It is appreciated that the estimated stress is a prediction of the load stress of the storage node. In practice, each storage node has a maximum limit for stress. The storage node may operate properly when the load stress of the storage node is beneath the limit. However, the storage node may suffer from overload when the load stress of the storage node exceeds the limit. As a result, the storage node may not be able to operate properly. The limit of a storage node may be determined according to the storage capacity thereof. Alternatively, in practice, a threshold beneath the limit may be predefined to ensure the normal operation of the storage node.

Furthermore, in practice, the pre-recorded node synchronization information may further comprise: CPU utilization, bandwidth occupied by reading of video data. a number of current reads, bandwidth occupied by writing of video data, disk I/O utilization and memory utilization of each storage node.

The stress estimation algorithm applied to a storage node may comprise:

A. estimating the writing stress of the storage node according to the bandwidth occupied by writing of video data and the number of current writes of the storage node;

B. calculating the reading stress of the storage node, according to the bandwidth occupied by reading of video data and the number of current reads of the storage node;

It may be appreciated that when video data is read, since the write position of the video data has already been determined, the read position is thereby determined.

In one implementation, the writing stress of the storage node may be estimated as follows:

the estimated writing stress of the storage node=the sum of the numbers of current writes of all the storage nodes in the storage cluster*(the bandwidth occupied by writing of video data of the storage node/the number of current writes of the storage node).

The reading stress of the storage node may be estimated as follows:

the reading stress of the storage node=the sum of the number of current reads of all the storage nodes in the storage cluster*(the bandwidth occupied by reading of video data of the storage node/the number of current reads of the storage node).

It is appreciated that a storage node may synchronize the node synchronization information with a management node whenever the management node receives a video data storage request. The storage node may also synchronize the information in response to video data writing into the storage node or a completion of the data writing. The two strategies may also be combined. In addition, a time interval may be set and the node synchronization information may be synchronized according to the set time interval. All of these are reasonable.

For example, for a writing stress of 80 Mb/s and a number of writes of 40 as recorded in the node synchronization information of the storage node A, each video data writing is determined to have a rate of 2 Mb/s. If a number of writes of 20 is recorded in the management node, the writing stress of the storage node may be estimated as 20*2 Mb/s=40 Mb/s.

C. estimating the stress of the storage node, according to the CPU utilization, the memory utilization, the disk IO utilization, the estimated writing stress and reading stress of the storage node.

Whenever the management node receives a video data storage request, the management node may estimate the stress of each storage node according to the node synchronization information of each storage node.

For example, in practice, the writing stress may be estimated as follows.

The estimated stress of the storage node=estimated writing stress+reading stress+CPU utilization+the memory utilization+disk/IO utilization.

In order to set a threshold, the units of these parameters have to be unified so that they can be added. Upper limits can be defined for these parameters. For example, units of the parameters are unified as 1000, the upper limit for the reading stress and the limit for the estimated writing stress are both 500, and the upper limits for the CPU utilization, the memory utilization and disk I/O utilization are 900. The upper limits of such parameters may be adjusted according to actual needs, but are not allowed to exceed the maximum of 1000. In this case, the threshold may be defined as follows.

The threshold=500+500+900+900+900=3700;

In an example, the node synchronization information of the current storage node illustrates an estimated stress of 500 Mbps, a reading stress of 300 Mbps, a CPU utilization of 50%, a memory utilization of 20% and a disk I/O utilization of 40%. These values can be added with their units unified. The estimated stress of the storage node can be obtained as follows: estimated stress of the storage node=500+300+500+200+400=1900. As such, the estimated stress is smaller than the threshold 3700, the storage node is thus considered as available at the moment.

To estimate the reading stress and the writing stress, the number of network cards and bandwidths of network cards may also be taken into consideration.

For example, if a storage node has two network cards, each having a bandwidth of 1 Gbps, the stress of the storage node may be estimated as: stress=500/2+300/2+500+200+400=1500.

It can be seen that the stress of each storage node can be estimated according to the stress estimation algorithm including steps A, B and C.

It is noted that, the above-described specific implementation of selecting from the queue of allocable storage nodes a target storage node allocable as a write node according to the number of current writes of each storage node in pre-recorded node synchronization information and a stress estimation algorithm is only an example, and should not be construed as a limiting to embodiments of the present disclosure. The above-described specific implementation of selecting, according to a stress estimation algorithm, a target storage node allocable as a write node from the queue of allocable storage nodes is only an example, and should not be construed as limit to embodiments of the present disclosure. Likewise, the specific implementation of the stress estimation algorithm is only an example, and should not be construed as limit to embodiments of the present disclosure.

Figure 4:
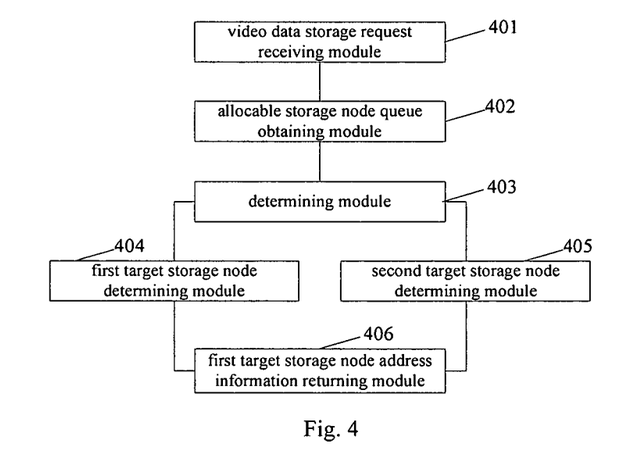
FIG. 4 is a structural schematic diagram of an apparatus for allocating storage resource of video cloud storage according to an embodiment of the present disclosure.

In correspondence with the above method embodiments, another embodiment of the present disclosure provides an apparatus for allocating storage resource of video cloud storage, applicable to a management node in a storage cluster, the storage cluster comprising at least one management node and at least one storage node. As shown in FIG. 4, the apparatus may comprise:

a video data storage request receiving module 401, configured for receiving a video data storage request sent by a client based on an encoder, the video data storage request containing the indentifier of a resource pool into which a video data is to be written and an identifier of the encoder;

an allocable storage node queue obtaining module 402, configured for obtaining, from a plurality of storage nodes corresponding to the identifier of the resource pool, a queue of allocable storage nodes for the video data storage request, wherein, the correspondence between an identifier of a resource pool and a storage node is predefined;

a determining module 403, configured for determining whether the identifier of the encoder is recorded in an encoder allocation tracing list; if so, activating a first target storage node determining module 404, or otherwise, activating a second target storage node determining module 405, wherein the encoder allocation tracing list records the correspondence between an identifier of an encoder that has been allocated a storage node and the allocated storage node;

the first target storage node determining module 404 is configured for selecting from the queue of allocable storage nodes a target storage node allocable as a write node, according to the number of current writes of each of the storage nodes in pre-recorded node synchronization information and a stress estimation algorithm, wherein the stress estimation algorithm is an algorithm for estimating the stress on a storage node according to the node synchronization information;

the second target storage node determining module 405 is configured for selecting, from the queue of allocable storage node, a target storage node allocable as the write node, according to the stress estimation algorithm; and a first target storage node address information returning module 406, configured for, if a target storage node allocable as a write node is selected from the queue of allocable storage nodes, feeding back the address information of the target storage node to the client based on the encoder to allow the client to write the video data corresponding to the video data storage request into the target storage node.

In the embodiments of the present disclosure, for a encoder that requests video data storage for the first time, a different allocation method is employed to select the target storage node to serve as the write node. Further, in addition to load stress, the storage capacity of each storage node is also taken into account in order to select the target storage node. A recommended number of writes is calculated. Therefore, a larger number of writes may be distributed to storage nodes with higher capacities, and a smaller number of writes may be distributed to storage nodes with lower capacities. A stress estimation algorithm is employed to estimate the stress on each storage node. As such, each storage node may be prevented from excessive load stress. The storage cluster may have a balanced load and more stable operation.

In correspondence with the abovementioned method embodiments, to select the storage nodes allocable as write nodes, in one implementation, the pre-recorded node synchronization information comprises: CPU utilization, bandwidth occupied by reading of video data, a number of current reads, bandwidth occupied by writing of video data, disk I/O utilization and memory utilization of a storage node.

The stress estimation algorithm utilized by the first target storage node determining module 404 and the second target storage node determining module 405 of the apparatus for allocating storage resources of cloud storage as provided in the embodiment may comprise:

estimating writing stress of a storage node according to bandwidth occupied by writing of video data and the number of current writes of the storage node;

calculating the reading stress of a storage node, according to the bandwidth occupied by reading of video data and the number of current reads of the storage node; and estimating stress of the storage node according to the CPU utilization, the memory utilization, the disk IO utilization, the estimated writing stress and the reading stress of the storage node.

In one implementation, the writing stress of the storage node is estimated as follows:

the estimated writing stress of the storage node=the sum of the numbers of current writes of all the storage nodes in the storage cluster*(the bandwidth occupied by writing of video data of the storage node/the number of current writes of the storage node).

Likewise, the reading stress of the storage node is calculated as follows:

the reading stress of the storage node=the sum of the numbers of current reads of all the storage nodes in the storage cluster*(the bandwidth occupied by reading of video data of the storage node/the number of current reads of the storage node).

Furthermore, the apparatus for allocating storage resource of video cloud storage according to an embodiment of the present disclosure may further comprise: a second target storage node address information returning module.

The second target storage node address information returning module may be configured for, if a target storage node allocable as a write node cannot be selected from the queue of allocable storage nodes, selecting randomly a storage node to be the target storage node from the queue of allocable storage nodes, and providing the address information of the target storage node to the client based on the encoder to allow the client to write the video data corresponding to the video data storage request into the target storage node.

In one implementation, the video data storage request may further comprise the network address of the client.

The allocable storage node queue obtaining module may comprise a first storage node determining submodule and a first allocable storage node queue obtaining submodule.

The first storage node determining submodule is configured for determining, from the plurality of storage nodes corresponding to the identifier of resource pool, storage nodes corresponding to the network address of the client; wherein the correspondence between ranges of network addresses and storage nodes is predefined.

The first allocable storage node queue obtaining submodule is configured for obtaining, from the determined storage nodes corresponding to a network address of the client, a queue of allocable storage nodes for the video data storage request.

Furthermore, the apparatus for allocating storage resource of video cloud storage according to an embodiment of the present disclosure may further comprise: an increasing module configured for increasing the number of current writes of the target storage node by one, to update the node synchronization information of the target storage node.

In correspondence with the above method embodiment, in one implementation, the first target storage node determining module 404 of the apparatus for allocating storage resource of video cloud storage according to an embodiment of the present disclosure may further comprise:

a second storage node determining submodule configured for determining, from the queue of allocable storage nodes, a storage node allocated for the encoder last time, according to the encoder allocation tracing list; and a storage node processing submodule configured for taking a storage node next to the allocated storage node allocated last time in the queue of allocable storage nodes as a to-be-determined current storage node and performing the selection operations as follows:

obtaining the number of current writes of the current storage node, from the pre-recorded node synchronization information for storage nodes;

calculating a recommended number of writes of the current storage node;

determining whether the number of current writes is smaller than the recommended number of writes, and if the number of current writes is smaller than the recommended number of writes, estimating the stress of the storage node according to the stress estimation algorithm; if the estimated stress is smaller than a predetermined threshold, selecting the current storage node as the target storage node allocable as a write node, and terminating the selection process, or if the estimated stress is not smaller than the predetermined threshold, proceeding back to the step of taking a storage node next to the current storage node in the queue of allocable storage nodes as a to-be-determined current storage node and performing the selection operations until all storage nodes in the queue of allocable storage nodes have been taken as a to-be-determined current storage node; and if the number of current writes is larger than or equal to the recommended number of writes, proceeding back to the step of taking a storage node next to the current storage node in the queue of allocable storage nodes as a to-be-determined current storage node and performing the selection operations until all storage nodes in the queue of allocable storage nodes have been taken as a to-be-determined current storage node.

In one implementation, the storage node processing submodule calculates the recommended number of writes of the current storage node as follows:

the recommended number of writes of the current storage node=the total of writes of all the storage nodes in the storage cluster*(the total storage space of the current storage node/the total storage space of all the storage nodes).

In one implementation, the second target storage node determining module 405 comprises a stress estimation submodule and a target storage node determining submodule.

The stress estimation submodule is configured for estimating the stress of each storage node in the queue of allocable storage nodes according to the stress estimation algorithm based on the node synchronization information.

The target storage node determining submodule is configured for selecting randomly from the storage nodes a storage node having an estimated stress lower than a predetermined threshold, as the target storage node allocable as the write node.

Furthermore, the apparatus for allocating storage resource of video cloud storage according to an embodiment of the present disclosure may further comprise: a decreasing module configured for decreasing the number of current writes of the determined storage node allocated to the encoder last time by one, in the recorded node synchronization information of the storage nodes.

In one implementation, the allocable storage node queue obtaining module comprises a third storage node determining submodule and a second allocable storage node queue determining submodule.

The third storage node determining submodule is configured for determining at least one storage node satisfying an allocation condition from the plurality of storage nodes corresponding to the identifier of the resource pool, according to pre-recorded node synchronization information of the storage nodes.

The second allocable storage node queue determining submodule is configured for establishing the queue of allocable storage nodes for the video data storage request based on the at least one storage node satisfying the allocation condition.

In one implementation, the node synchronization information further comprises: online status, operation state, and remaining space of a storage node.

In this case, a storage node satisfies the allocation condition if the synchronization information indicates that the storage node is online, in a normal operation state, and having remaining storage space.

Alternatively, the node synchronization information comprises: online status, operation state, remaining space, formatting state, the number of current writes, and a maximum number of current writes of a storage node.

In this case, a storage node satisfies the allocation condition if the synchronization information indicates that the storage node is online, in a normal operation state, having remaining storage space, and not being formatted, and the number of current writes is smaller than the maximum number of writes.

In one implementation mode, the video data storage request is sent by the client based on at least one encoder at a preset time interval.

In another aspect, embodiments of the present disclosure further provide an electronic device, comprising: a housing, a processor, a memory, a circuit board and a power supply circuit, wherein, the circuit board is placed within the space enclosed by the housing; the processor and memory are disposed on the circuit board; the power supply circuit is configured for supplying power to circuits and devices of the electronic device; the memory is configured for storing executable program instructions; and the processor is configured for executing the program instructions stored in the memory to perform the method for allocating storage resource of video cloud storage as provided by embodiments of the present disclosure. The method of allocating storage resource of video cloud storage comprises:

receiving a video data storage request sent by a client based on an encoder, the video data storage request containing an identifier of a resource pool into which video data is to be written and an identifier of the encoder;

obtaining, from a plurality of storage nodes corresponding to the identifier of the resource pool, a queue of allocable storage nodes for the video data storage request, wherein, the correspondence between an identifier of a resource pool and a storage node is predefined;

determining whether the identifier of the encoder is recorded in an encoder allocation tracing list; if so, selecting from the queue of allocable storage nodes a target storage node allocable as a write node, according to the number of current writes of each of the storage nodes in pre-recorded node synchronization information and a stress estimation algorithm; or otherwise, selecting, from the queue of allocable storage nodes, a target storage node allocable as the write node, according to the stress estimation algorithm; wherein the encoder allocation tracing list records the correspondence between an identifier of an encoder that has been allocated a storage node and the allocated storage node, and wherein the stress estimation algorithm is an algorithm for estimating the stress on a storage node according to the node synchronization information; and if a target storage node allocable as a write node is selected from the queue of allocable storage nodes, feeding back address information of the target storage node to the client based on the encoder to allow the client to write the video data corresponding to the video data storage request into the target storage node.

Wherein the electronic apparatus may be used, as a management node in the storage cluster, to execute the method for allocating storage resource of video cloud storage, and the electronic device may be a management server.

In the embodiment of the present disclosure, the processor of the electronic device may execute a program by reading corresponding executable program codes stored in the memory, which, when executed, performs the method for allocating storage resource of video cloud storage according to embodiments of the present disclosure. As such, the storage cluster may have a balanced load and more stable operation can be allowed.

In a further aspect, embodiments of the present disclosure provide an executable program configured for performing, when executed, the method for allocating storage resource of video cloud storage according to embodiments of the present disclosure. The method of allocating storage resource of video cloud storage comprises:

receiving a video data storage request sent by a client based on an encoder, the video data storage request containing an identifier of a resource pool into which video data is to be written and an identifier of the encoder;

obtaining, from a plurality of storage nodes corresponding to the identifier of the resource pool, a queue of allocable storage nodes for the video data storage request, wherein, the correspondence between an identifier of a resource pool and a storage node is predefined;

determining whether the identifier of the encoder is recorded in an encoder allocation tracing list; if so, selecting from the queue of allocable storage nodes a target storage node allocable as a write node, according to the number of current writes of each of the storage nodes in pre-recorded node synchronization information and a stress estimation algorithm; or otherwise, selecting, from the queue of allocable storage nodes, a target storage node allocable as the write node, according to the stress estimation algorithm; wherein the encoder allocation tracing list records the correspondence between an identifier of an encoder that has been allocated a storage node and the allocated storage node, and wherein the stress estimation algorithm is an algorithm for estimating the stress on a storage node according to the node synchronization information; and if a target storage node allocable as a write node is selected from the queue of allocable storage nodes, feeding back address information of the target storage node to the client based on the encoder to allow the client to write the video data corresponding to the video data storage request into the target storage node.

In the embodiment of the present disclosure, the executable program code performs, when being executed, the method for allocating storage resource of video cloud storage according to embodiments of the present disclosure. Therefore, the storage cluster may have a balanced load and more stable operation can be allowed.

In another aspect, embodiments of the present disclosure further provide a storage medium configured for storing executable program codes, which, when executed, perform the method for allocating storage resource of video cloud storage according to embodiments of the present disclosure. The method for allocating storage resource of video cloud storage may comprise the following steps:

receiving a video data storage request sent by a client based on an encoder, the video data storage request containing an identifier of a resource pool into which video data is to be written and an identifier of the encoder;

obtaining, from a plurality of storage nodes corresponding to the identifier of the resource pool, a queue of allocable storage nodes for the video data storage request, wherein, the correspondence between an identifier of a resource pool and a storage node is predefined;

determining whether the identifier of the encoder is recorded in an encoder allocation tracing list; if so, selecting from the queue of allocable storage nodes a target storage node allocable as a write node, according to the number of current writes of each of the storage nodes in pre-recorded node synchronization information and a stress estimation algorithm; or otherwise, selecting, from the queue of allocable storage nodes, a target storage node allocable as the write node, according to the stress estimation algorithm; wherein the encoder allocation tracing list records the correspondence between an identifier of an encoder that has been allocated a storage node and the allocated storage node, and wherein the stress estimation algorithm is an algorithm for estimating the stress on a storage node according to the node synchronization information; and if a target storage node allocable as a write node is selected from the queue of allocable storage nodes, feeding back address information of the target storage node to the client based on the encoder to allow the client to write the video data corresponding to the video data storage request into the target storage node.

In the embodiment of the present disclosure, the storage medium stores the executable program codes which, when being executed, performs the method for allocating storage resource of video cloud storage according to embodiments of the present disclosure. Therefore, The storage cluster may have a balanced load and more stable operation.

A simple description is provided to the embodiments of the apparatus, electronic device, executable program and storage medium as they are substantially similar to the method embodiments. Reference may be made to description of relevant parts in the method embodiments.

It should be noted that in the claims and the specification, relationship terms such as "first", "second" and the like are only used to distinguish one entity or operation from another entity or operation, and do not necessarily require or imply that there is any such actual relationship or order between those entities or operations. Moreover, the terms "comprise" "include" or any other variants are intended to cover a non-exclusive inclusion, such that processes, methods, objects or devices including a series of elements include not only those elements, but also other elements not specified or the elements inherent to those processes, methods, objects or devices. Without further limitations, elements limited by the phrase "include(s) a . . . " do not exclude that there are other identical elements in the processes, methods, objects or devices that include that element.

Those of ordinary skill in the art can appreciate that all or a part of the embodiments described above can be implemented by instructing relevant hardware through a program. The program can be stored in a computer readable storage medium such as a ROM/RAM, magnetic disk, and optic disk.

What has been described above are merely preferred embodiments of the present application, and are not used to limit the scope of protection of the present application. Any modification, equivalent replacement or improvement made within the spirit and principle of the present application falls within the scope of protection of the present application.

What is claimed is:

1. A method for allocating storage resource of video cloud storage, applicable to a management node in a storage cluster, the storage cluster comprising at least one management node and at least one storage node, the method comprising:
receiving a video data storage request sent by a client based on an encoder, the video data storage request containing an identifier of a resource pool into which video data is to be written and an identifier of the encoder;
obtaining, from a plurality of storage nodes corresponding to the identifier of the resource pool, a queue of allocable storage nodes for the video data storage request, wherein, the correspondence between an identifier of a resource pool and a storage node is predefined;
determining whether the identifier_of the encoder is recorded in an encoder allocation tracing list; if so, selecting from the queue of allocable storage nodes a target storage node allocable as a write node, according to the number of current writes of each of the storage nodes in pre-recorded node synchronization information and a stress estimation algorithm; or otherwise, selecting, from the queue of allocable storage nodes, a target storage node allocable as the write node, according to the stress estimation algorithm; wherein the encoder allocation tracing list records the correspondence between an identifier of an encoder that has been allocated a storage node and the allocated storage node, and wherein the stress estimation algorithm is an algorithm for estimating the stress on a storage node according to the node synchronization information; and
if a target storage node allocable as a write node is selected from the queue of allocable storage nodes, feeding back address information of the target storage node to the client based on the encoder to allow the client to write the video data corresponding to the video data storage request into the target storage node.

2. The method according to claim 1, wherein the pre-recorded node synchronization information comprises: CPU utilization, bandwidth occupied by reading of video data, a number of current reads, bandwidth occupied by writing of video data, disk I/O utilization and memory utilization of a storage node;
the stress estimation algorithm comprises:
estimating writing stress of a storage node according to bandwidth occupied by writing of video data and the number of current writes of the storage node; and
calculating the reading stress of a storage node, according to the bandwidth occupied by reading of video data and the number of current reads of the storage node; and
estimating stress of the storage node according to the CPU utilization, the memory utilization, the disk TO utilization, the estimated writing stress and the reading stress of the storage node;
or wherein,
the method further comprises: if a target storage node allocable as a write node cannot be selected from the queue of allocable storage nodes, selecting randomly a storage node to be the target storage node from the queue of allocable storage nodes, and providing the address information of the target storage node to the client based on the encoder to allow the client to write the video data corresponding to the video data storage request into the target storage node;
or wherein,
the video data storage request further comprises the network address of the client;
obtaining, from a plurality of storage nodes corresponding to the identifier of resource pool, a queue of allocable storage nodes for the video data storage request comprises:
determining, from the plurality of storage nodes corresponding to the identifier of resource pool, storage nodes corresponding to a network address of the client; wherein the correspondence between ranges of network addresses and storage nodes is predefined; and
obtaining, from the determined storage nodes corresponding to the network address of the client, a queue of allocable storage nodes for the video data storage request;
or wherein,
the method further comprises: increasing the number of current writes of the target storage node by one, to update the node synchronization information of the target storage node;
or wherein,
selecting from the queue of allocable storage nodes a target storage node allocable as a write node, according to the number of current writes of each of the storage nodes in pre-recorded node synchronization information and a stress estimation algorithm write node comprises:
determining, from the queue of allocable storage nodes, a storage node allocated for the encoder last time, according to the encoder allocation tracing list;
taking a storage node next to the storage node allocated last time in the queue of allocable storage nodes as a to-be-determined current storage node and performing the selection operations as follows:
obtaining the number of current writes of the current storage node, from the pre-recorded node synchronization information for storage nodes;
calculating a recommended number of writes of the current storage node;
determining whether the number of current writes is smaller than the recommended number of writes, and if the number of current writes is smaller than the recommended number of writes, estimating the stress of the storage node according to the stress estimation algorithm; if the estimated stress is smaller than a predetermined threshold, selecting the current storage node as the target storage node allocable as a write node, and terminating the selection process, or if the estimated stress is not smaller than the predetermined threshold, proceeding back to the step of taking a storage node next to the current storage node in the queue of allocable storage nodes as a to-be-determined current storage node and performing the selection operations until all storage nodes in the queue of allocable storage nodes have been taken as a to-be-determined current storage node;

if the number of current writes is larger than or equal to the recommended number of writes, proceeding back to the step of taking a storage node next to the current storage node in the queue of allocable storage nodes as a to-be-determined current storage node and performing the selection operations until all storage nodes in the queue of allocable storage nodes have been taken as a to-be-determined current storage node.

3. The method according to claim 2, wherein the writing stress of the storage node is estimated as follows:

the estimated writing stress of the storage node=the sum of the numbers of current writes of all the storage nodes in the storage cluster*(the bandwidth occupied by writing of video data of the storage node/the number of current writes of the storage node);

the reading stress of the storage node is calculated as follows:

the reading stress of the storage node=the sum of the numbers of current reads of all the storage nodes in the storage cluster*(the bandwidth occupied by reading of video data of the storage node/the number of current reads of the storage node).

4. The method according to claim 2, wherein the recommended number of writes of the current storage node is calculated as follows:

the recommended number of writes of the current storage node=the total of writes of all the storage nodes in the storage cluster*(the total storage space of the current storage node/the total storage space of all the storage nodes).

5. The method according to claim 2, further comprising:
decreasing the number of current writes of the determined storage node allocated to the encoder last time by one, in the recorded node synchronization information of the storage nodes.

6. The method according to claim 1, wherein selecting, according to a stress estimation algorithm, a target storage node allocable as a write node from the queue of allocable storage nodes comprises:
estimating the stress of each storage node in the queue of allocable storage nodes according to the stress estimation algorithm based on the node synchronization information; and
selecting randomly from the storage nodes a storage node having an estimated stress lower than a predetermined threshold, as the target storage node allocable as the write node.

7. The method according to claim 1, wherein, obtaining, from a plurality of storage nodes corresponding to the identifier of resource pool, a queue of allocable storage nodes for the video data storage request comprises:
determining at least one storage node satisfying an allocation condition from the plurality of storage nodes corresponding to the identifier of the resource pool, according to pre-recorded node synchronization information of the storage nodes; and
establishing the queue of allocable storage nodes for the video data storage request based on the at least one storage node satisfying the allocation condition.

8. The method according to claim 7, wherein, the node synchronization information further comprises: online status, operation state, and remaining space of a storage node;

a storage node satisfies the allocation condition if the synchronization information indicates that the storage node is online, in a normal operation state, and having remaining storage space;

or, the node synchronization information comprises: online status, operation state, remaining space, formatting state, the number of current writes, and a maximum number of current writes of a storage node;

a storage node satisfies the allocation condition if the synchronization information indicates that the storage node is online, in a normal operation state, having remaining storage space, and not being formatted, and the number of current writes is smaller than the maximum number of writes.

9. The method according to claim 1, wherein the video data storage request is sent by the client based on at least one encoder at a preset time interval.

10. An electronic device, comprising: a housing, a processor, a memory, a circuit board and a power supply circuit, wherein, the circuit board is placed within the space enclosed by the housing; the processor and memory are disposed on the circuit board; the power supply circuit is configured for supplying power to circuits and devices of the electronic device; the memory is configured for storing executable program instructions; and the processor is configured for executing the program instructions stored in the memory to perform the method for allocating storage resource of video cloud storage according to claim 1.

11. A non-transitory storage medium, configured for storing executable program codes, which, when executed, perform the method for allocating storage resource of video cloud storage according to claim 1.

12. An apparatus for allocating storage resource of video cloud storage, applicable to a management node in a storage cluster, the storage cluster comprising at least one management node and at least one storage node, the apparatus comprising:
a video data storage request receiving module configured for receiving a video data storage request sent by a client based on an encoder, the video data storage request containing the identifier of a resource pool into which a video data is to be written and an identifier of the encoder;
an allocable storage node queue obtaining module configured for obtaining, from a plurality of storage nodes corresponding to the identifier of the resource pool, a queue of allocable storage nodes for the video data storage request, wherein, the correspondence between an identifier of a resource pool and a storage node is predefined;
a determining module configured for determining whether the identifier of the encoder is recorded in an encoder allocation tracing list; if so, activating a first target storage node determining module, or otherwise, activating a second target storage node determining module, wherein the encoder allocation tracing list records the correspondence between an identifier of an encoder that has been allocated a storage node and the allocated storage node;
the first target storage node determining module is configured for selecting from the queue of allocable storage nodes a target storage node allocable as a write node, according to the number of current writes of each of the storage nodes in pre-recorded node synchronization information and a stress estimation algorithm, wherein the stress estimation algorithm is an algorithm for estimating the stress on a storage node according to the node synchronization information;

the second target storage node determining module is configured for selecting, from the queue of allocable storage node, a target storage node allocable as the write node, according to the stress estimation algorithm; and a first target storage node address information returning module configured for, if a target storage node allocable as a write node is selected from the queue of allocable storage nodes, feeding back the address information of the target storage node to the client based on the encoder to allow the client to write the video data corresponding to the video data storage request into the target storage node.

13. The apparatus according to claim 12, wherein the pre-recorded node synchronization information comprises: CPU utilization, bandwidth occupied by reading of video data, a number of current reads, bandwidth occupied by writing of video data, disk I/O utilization and memory utilization of a storage node;

the stress estimation algorithm utilized by the first target storage node determining module and the second target storage node determining module comprises:

estimating writing stress of a storage node according to bandwidth occupied by writing of video data and the number of current writes of the storage node;

calculating the reading stress of a storage node, according to the bandwidth occupied by reading of video data and the number of current reads of the storage node; and estimating stress of the storage node according to the CPU utilization, the memory utilization, the disk IO utilization, the estimated writing stress and the reading stress of the storage node;

or wherein, the apparatus further comprises: a second target storage node address information returning module configured for, if a target storage node allocable as a write node cannot be selected from the queue of allocable storage nodes, selecting randomly a storage node to be the target storage node from the queue of allocable storage nodes, and providing the address information of the target storage node to the client based on the encoder to allow the client to write the video data corresponding to the video data storage request into the target storage node;

or wherein, the video data storage request further comprises the network address of the client;

the allocable storage node queue obtaining module comprises a first storage node determining submodule and a first allocable storage node queue obtaining submodule;

the first storage node determining submodule is configured for determining, from the plurality of storage nodes corresponding to the identifier_of resource pool, storage nodes corresponding to the network address of the client; wherein the correspondence between ranges of network addresses and storage nodes is predefined;

the first allocable storage node queue obtaining submodule is configured for obtaining, from the determined storage nodes corresponding to a network address of the client, a queue of allocable storage nodes for the video data storage request;

or wherein, the apparatus further comprises: an increasing module configured for increasing the number of current writes of the target storage node by one, to update the node synchronization information of the target storage node;

or wherein, the first target storage node determining module comprises:

a second storage node determining submodule configured for determining, from the queue of allocable storage nodes, a storage node allocated for the encoder last time, according to the encoder allocation tracing list; and a storage node processing submodule configured for taking a storage node next to the allocated storage node allocated last time in the queue of allocable storage nodes as a to-be-determined current storage node and performing the selection operations as follows:

obtaining the number of current writes of the current storage node, from the pre-recorded node synchronization information for storage nodes;

calculating a recommended number of writes of the current storage node;

determining whether the number of current writes is smaller than the recommended number of writes, and if the number of current writes is smaller than the recommended number of writes, estimating the stress of the storage node according to the stress estimation algorithm; if the estimated stress is smaller than a predetermined threshold, selecting the current storage node as the target storage node allocable as a write node, and terminating the selection process, or if the estimated stress is not smaller than the predetermined threshold, proceeding back to the step of taking a storage node next to the current storage node in the queue of allocable storage nodes as a to-be-determined current storage node and performing the selection operations until all storage nodes in the queue of allocable storage nodes have been taken as a to-be-determined current storage node; and if the number of current writes is larger than or equal to the recommended number of writes, proceeding back to the step of taking a storage node next to the current storage node in the queue of allocable storage nodes as a to-be-determined current storage node and performing the selection operations until all storage nodes in the queue of allocable storage nodes have been taken as to-be-determined current storage node.

14. The apparatus according to claim 13, wherein the writing stress of the storage node is estimated as follows:

the estimated writing stress of the storage node=the sum of the numbers of current writes of all the storage nodes in the storage cluster*(the bandwidth occupied by writing of video data of the storage node/the number of current writes of the storage node);

the reading stress of the storage node is calculated as follows:

the reading stress of the storage node=the sum of the numbers of current reads of all the storage nodes in the storage cluster*(the bandwidth occupied by reading of video data of the storage node/the number of current reads of the storage node).

15. The apparatus according to claim 13, wherein the storage node processing submodule calculates the recommended number of writes of the current storage node as follows:

the recommended number of writes of the current storage node=the total of writes of all the storage nodes in the storage cluster*(the total storage space of the current storage node/the total storage space of all the storage nodes).

16. The apparatus according to claim 13, further comprising: a decreasing module configured for decreasing the number of current writes of the determined storage node allocated to the encoder last time by one, in the recorded node synchronization information of the storage nodes.

17. The apparatus according to claim 12, wherein the second target storage node determining module comprises a stress estimation submodule and a target storage node determining submodule;

the stress estimation submodule is configured for estimating the stress of each storage node in the queue of allocable storage nodes according to the stress estimation algorithm based on the node synchronization information;

the target storage node determining submodule is configured for selecting randomly from the storage nodes a storage node having an estimated stress lower than a predetermined threshold, as the target storage node allocable as the write node.

18. The apparatus according to claim 12, wherein
the allocable storage node queue obtaining module comprises a third storage node determining submodule and a second allocable storage node queue determining submodule;

the third storage node determining submodule is configured for determining at least one storage node satisfying an allocation condition from the plurality of storage nodes corresponding to the identifier of the resource pool, according to pre-recorded node synchronization information of the storage nodes;

the second allocable storage node queue determining submodule is configured for establishing the queue of allocable storage nodes for the video data storage request based on the at least one storage node satisfying the allocation condition.

19. The apparatus according to claim 18, wherein, the node synchronization information further comprises: online status, operation state, and remaining space of a storage node;

a storage node satisfies the allocation condition if the synchronization information indicates that the storage node is online, in a normal operation state, and having remaining storage space;

or, the node synchronization information comprises: online status, operation state, remaining space, formatting state, the number of current writes, and a maximum number of current writes of a storage node;

a storage node satisfies the allocation condition if the synchronization information indicates that the storage node is online, in a normal operation state, having remaining storage space, and not being formatted, and the number of current writes is smaller than the maximum number of writes.

20. The apparatus according to claim 12, wherein the video data storage request is sent by the client based on at least one encoder at a preset time interval.

* * * * *